US006608303B2

(12) United States Patent
Amy et al.

(10) Patent No.: US 6,608,303 B2
(45) Date of Patent: Aug. 19, 2003

(54) QUADRUPOLE ION TRAP WITH ELECTRONIC SHIMS

(75) Inventors: Jonathan W. Amy, West Lafayette, IN (US); Michael Senko, Sunnyvale, CA (US); Dennis M. Taylor, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 88 days.

(21) Appl. No.: 09/875,714

(22) Filed: Jun. 6, 2001

(65) Prior Publication Data

US 2002/0185596 A1 Dec. 12, 2002

(51) Int. Cl.[7] .......................... B01D 59/44; H01J 49/00
(52) U.S. Cl. ...................................................... 250/292
(58) Field of Search ......................................... 250/292

(56) References Cited

U.S. PATENT DOCUMENTS

| | | | | |
|---|---|---|---|---|
| 4,540,884 A | | 9/1985 | Stafford et al. | |
| RE34,000 E | | 7/1992 | Syka et al. | |
| 5,170,054 A | | 12/1992 | Franzen | |
| 5,420,425 A | | 5/1995 | Bier et al. | |
| 5,468,958 A | | 11/1995 | Franzen et al. | |
| 5,576,540 A | * | 11/1996 | Jolliffe | 250/292 |
| 5,747,801 A | | 5/1998 | Quarmby et al. | |
| 6,087,658 A | | 7/2000 | Kawato | |
| RE36,906 E | | 10/2000 | Franzen et al. | |
| 6,157,030 A | * | 12/2000 | Sakairi et al. | 250/292 |

FOREIGN PATENT DOCUMENTS

| | | |
|---|---|---|
| WO | WO 98/05039 | 2/1998 |
| WO | PCT/US 02/17871 | 5/2002 |

OTHER PUBLICATIONS

G. Bollen, S. Becker, H.J. Kluge, M. König, R.B. Moore, T. Otto, H. Raimbault–Hartmann, G. Savard, L. Schweikhard, H. Stolzenberg, the ISOLDE Collaboration, "ISOLTRAP: a tandem Penning trap system for accurate on–line mass determination of short lied isotypes", Nuclear Instruments and Methods in Physics Research A 368 (1996), pp. 675–697.

* cited by examiner

*Primary Examiner*—John R. Lee
*Assistant Examiner*—James J Leybourne
(74) *Attorney, Agent, or Firm*—Dorsey & Whitney LLP

(57) ABSTRACT

There is provided a quadrupole ion trap mass spectrometer of the type having a plurality of ring electrodes and defining a trapping volume. The quadrupole potential faults arising from apertures in the electrodes are corrected by an apertured shim electrode placed within and spaced from the walls of the electrode apertures.

20 Claims, 8 Drawing Sheets

QUADRUPOLE ION TRAP WITH ELECTRONIC SHIMS

BRIEF DESCRIPTIONS OF THE INVENTION

This invention relates to a quadrupole ion trap and method, and more particularly to an ion trap in which shim electrodes compensate for electric potential faults introduced by apertures drilled into the entrance and exit end caps.

BACKGROUND OF THE INVENTION

An ion trap, in its most common configuration, is composed of a central ring electrode and two end cap electrodes. Other quadrupole ion trap configurations are described in U.S. Pat. No. 5,420,425. Generally, each electrode has a hyperbolic surface facing an internal volume known as the trapping volume. The trapping volume also serves as an analyzing space in which selected ions are retained and sequentially ejected, based upon their mass and charge. It also serves as a reaction volume, in which fragmentation of charged particles is caused by both collisions and interactions with specific fields. When a radio frequency (RF) voltage is applied between the ring and end cap electrodes, a quadrupolar potential is induced within the trapping volume. Generally, each of the end caps has one or more holes drilled into the center for the purpose of introducing ions or electrons into the trapping volume through the entrance end cap and for ejecting ions from the trapping volume to an external detection system through the exit end cap. Ions introduced into or formed within the trapping volume will or will not have stable trajectories, depending upon their mass, charge, the magnitude and frequency of the applied voltages, and the dimensions and geometry of the three electrodes.

Quadrupole ion trap potentials deviate from the ideal quadrupolar potential for two reasons: 1) because of holes drilled into the end caps, and 2) because the shapes of the electrodes have finite values. These effects are referred to as electric potential faults.

The electric potential deviation results in both peak broadening and, in some cases, a shift in measured ion mass from the theoretical mass values. Several schemes have been used and proposed to neutralize electric potential fault effects upon motion of the trapped ions. Franzen et al. U.S. Pat. No. 5,468,958 describes a quadrupole ion trap with switchable multipole fractions, which can be used to correct the electric potential errors due to the finite size of the electrodes.

Electric potential deviations due to the finite size of the trap electrodes are relatively insignificant compared to the deviations caused by the holes used to inject and eject ions. One method for correcting the deviations due to the holes is to stretch the spacing of the end cap electrodes from the ring electrode beyond the theoretical spacing predicted by solving the equations of motion of charged particles contained within the trapping volume A different approach has been taken by Shimadzu Corporation in U.S. Pat. No. 6,087,658, in which they have mechanically modified the end cap electrodes with a bulge at the internal end of each hole. The stated purpose of the bulge is that it corrects the deviation in the electric potential from the pure quadrupole electric potential by controlling the deviation of the electric potential around the central end cap hole.

OBJECTS AND SUMMARY OF THE INVENTION

It is an object of the present invention to provide a quadrupole ion trap in which electric potential faults are minimized.

There is provided a quadrupole ion trap of the type including a ring electrode and first and second end cap electrodes which define a trapping volume. The end cap electrodes include central apertures for the injection of ions or electrons into the trapping volume and for the ejection of stored ions during analysis of a sample. Electric potential faults in the RF trapping potential are compensated by shim electrodes carried within the central apertures and electrically insulated from the end cap electrodes.

In another embodiment of the invention, there is provided a linear quadrupole ion trap with four electrodes, each divided into one or more sections. One or more apertures are provided for ejection of ions during sample analysis. Electric potential faults in the RF trapping potential are compensated by shim electrodes carried within the apertures and electrically insulated from the adjacent electrodes.

BRIEF DESCRIPTION OF THE DRAWINGS

The foregoing and other objects of the invention will be more clearly understood from the following description when read in connection with the accompanying drawings of which.

DESCRIPTION OF THE INVENTION

Figure 1:
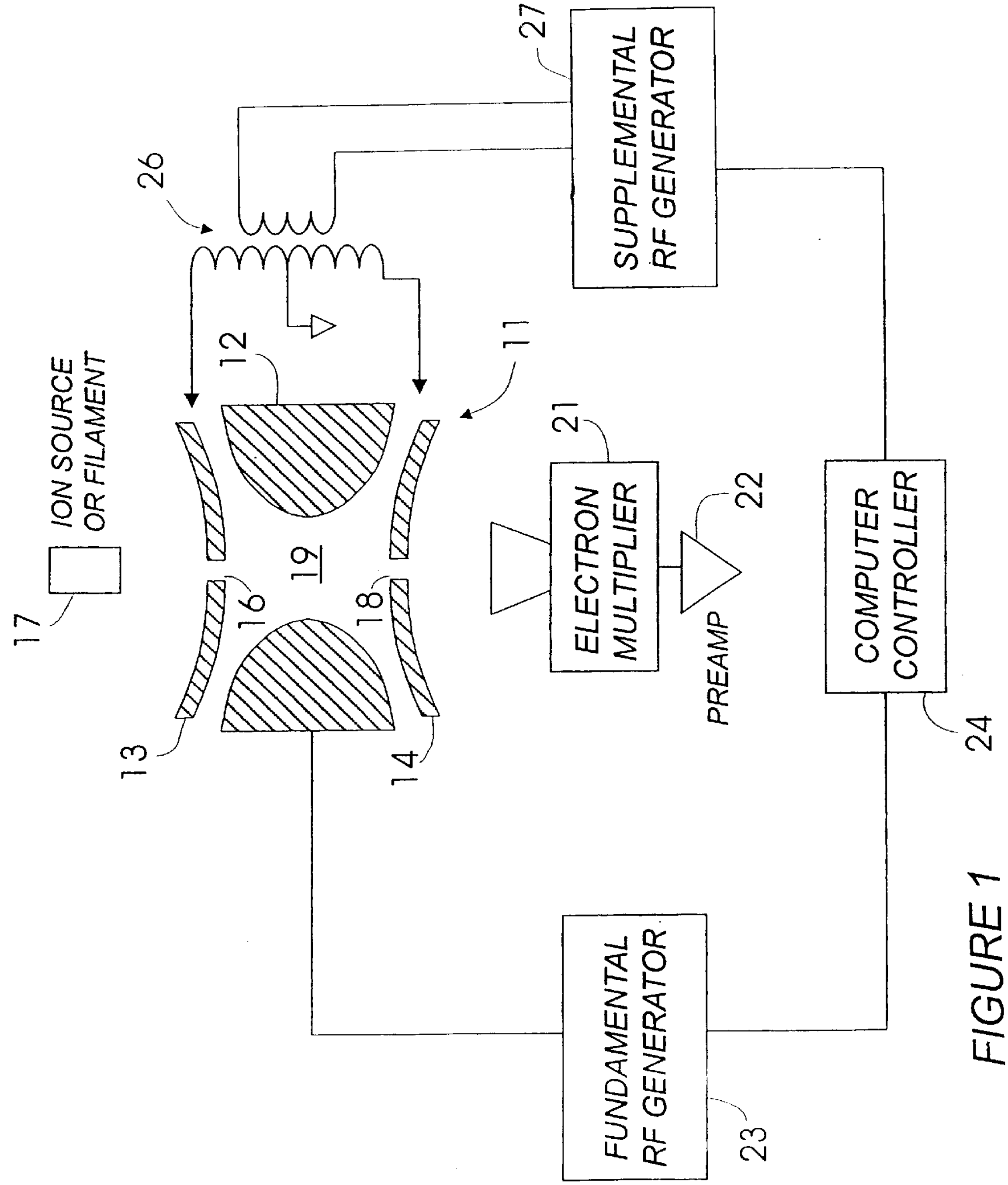
FIG. 1 schematically shows a conventional ion trap mass spectrometer.

Referring to FIG. 1, an ion trap mass spectrometer in accordance with the prior art is schematically illustrated. The mass spectrometer includes an ion trap 1 having a ring electrode 12 and end cap electrodes 13 and 14. The electrode 13 includes an aperture 16 through which electrons formed by the electron gun 17 may be injected into the ion trap volume to ionize a sample. Alternatively, the sample may be ionized externally and the ions injected into the trap through the aperture 16. In either event, ions of interest are introduced into the trap. The lower end cap 14 includes an aperture 18, which allows ions to escape the trapping volume 19 of the ion trap. These ions are then detected by the electron multiplier 21. The output of the electron multiplier is pre-amplified by pre-amplifier 22 and supplied to an associated processor (not shown). A fundamental RF generator 23 applies suitable voltage between the ring electrode 12 and end caps 13 and 14 to generate quadrupole trapping potentials within the ion trap volume 19. The potentials trap ions over a predetermined mass range of interest. The RF generator is controlled via a computer controller 24. The end caps are connected to the secondary of a transformer 26, which applies supplemental or excitation voltages across the end caps. The primary of the transformer 26 is connected to supplemental RF generator 27. Operation of the supplemental RF generator is controlled by the computer controller 24.

In one mode of operation (MS), to determine the mass of ions trapped in the trapping volume by the RF trapping potentials, the supplemental voltage is employed to cause ions having a mass excited by a given frequency of supplemental RF voltage to be ejected from the ion trap through the aperture 18 where they are detected by the electron multiplier 21. In another mode of operation (MS/MS), the supplemental voltage has a frequency which excites parent ions. The energy applied to the end caps causes a trapped parent ion to undergo collision-induced dissociation (CID) with background neutrals. A second sequential supplemental RF pulse is then applied and the daughter ions of interest are ejected for detection.

Figure 2:
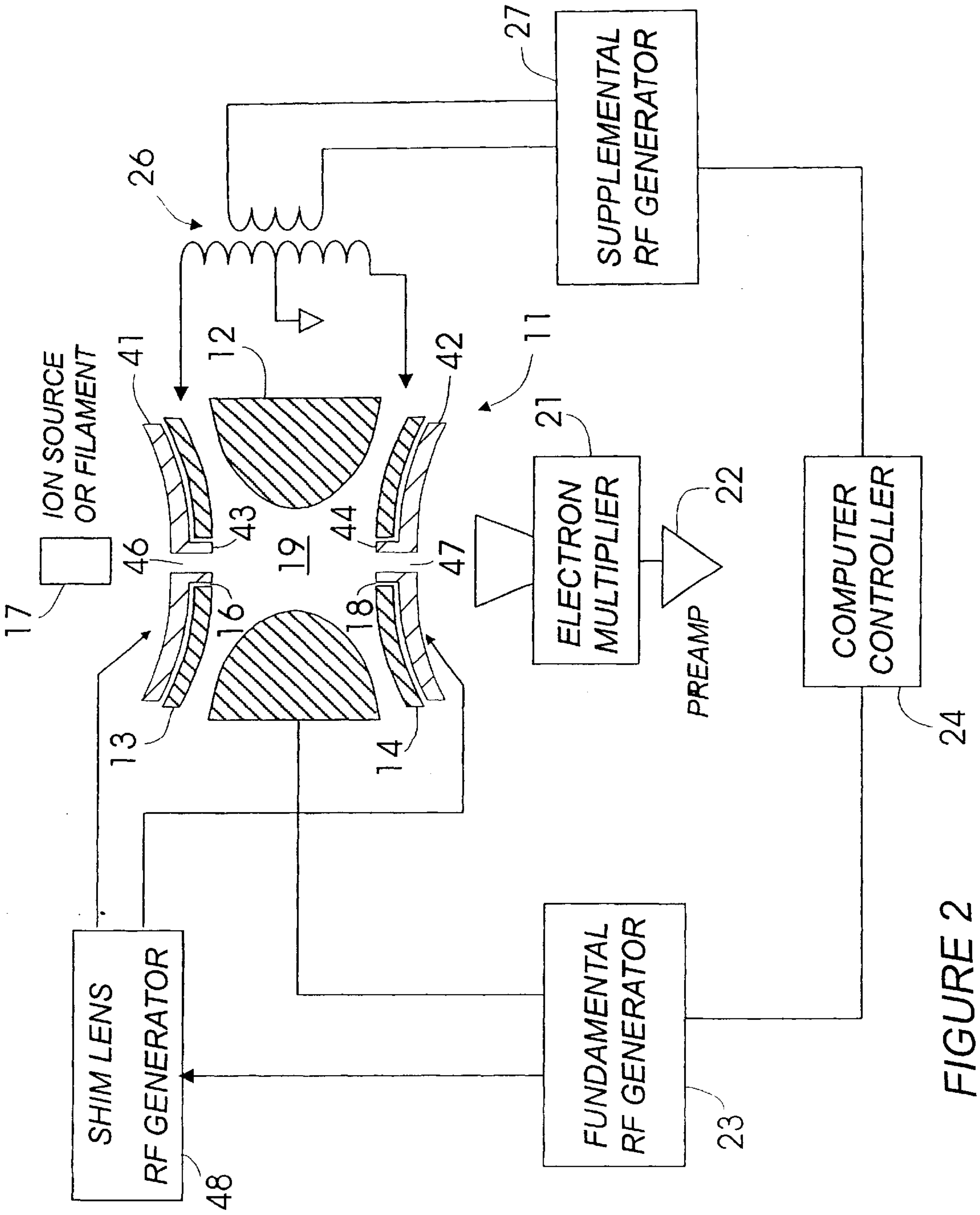
FIG. 2 schematically shows an ion trap mass spectrometer with improved ion trap electrodes.

In accordance with the present invention, the ion trap end cap electrodes are modified by providing shim electrodes within the apertures 16 and 18 to compensate for electric potential faults in the quadrupolar ion trap. Referring particularly to FIG. 2, wherein the same reference numbers have been used for like parts, shim electrodes 41 and 42 are associated with the end cap electrodes 13 and 14, respectively. The shim electrodes include a cylindrical portion 43, 44 which extend into and are spaced from the apertures 16 and 18 of the end cap electrodes 13 and 14. The cylindrical shim electrodes include apertures 46 and 47. Aperture 46 permits the introduction of ions from an ion source or electrons which ionize sample within the trap volume 19. The aperture 47 permits the ejection of ions from the ion trap into the electron multiplier. In one mode of operation, an RF voltage at the frequency of the fundamental RF trapping voltage and 180 degrees out of phase therewith is applied to the shim electrodes by the shim lens RF generator 48. In FIG. 2, the end of the cylindrical shim electrode is flush with the inner surface of the end cap electrodes. However, the ends of shim electrodes may extend into the trapping volume, FIG. 6, or may be indented, FIG. 7.

Figure 3:
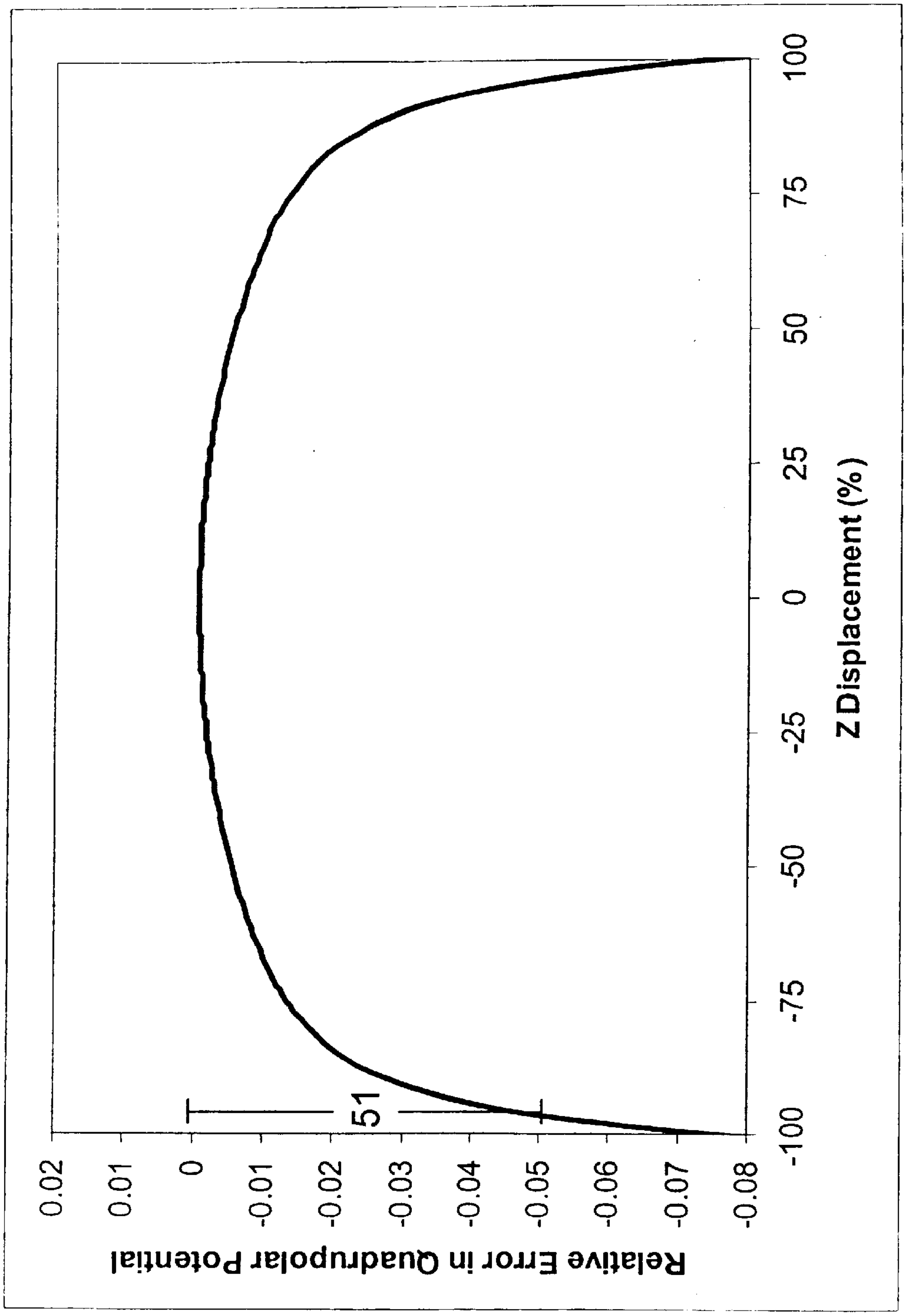
FIG. 3 is a graph of the error of the RF potential within a conventional ion trap generated using the program SIMION 3d Version 6.0
Figure 4:
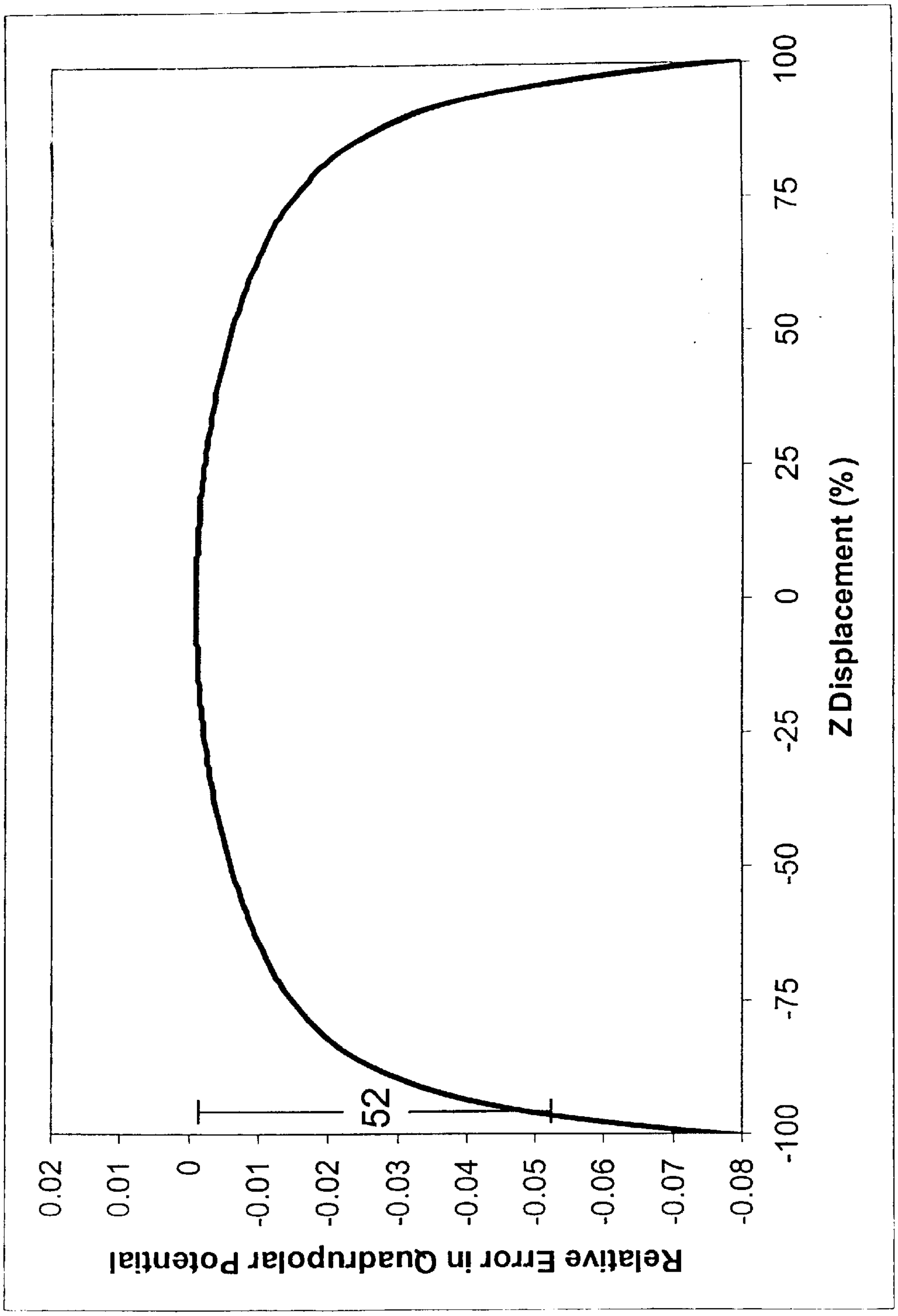
FIG. 4 is a graph of the error of the RF potential within a quadrupole ion trap with the shim electrodes having the same RF voltage applied thereto as the corresponding end cap.
Figure 5:
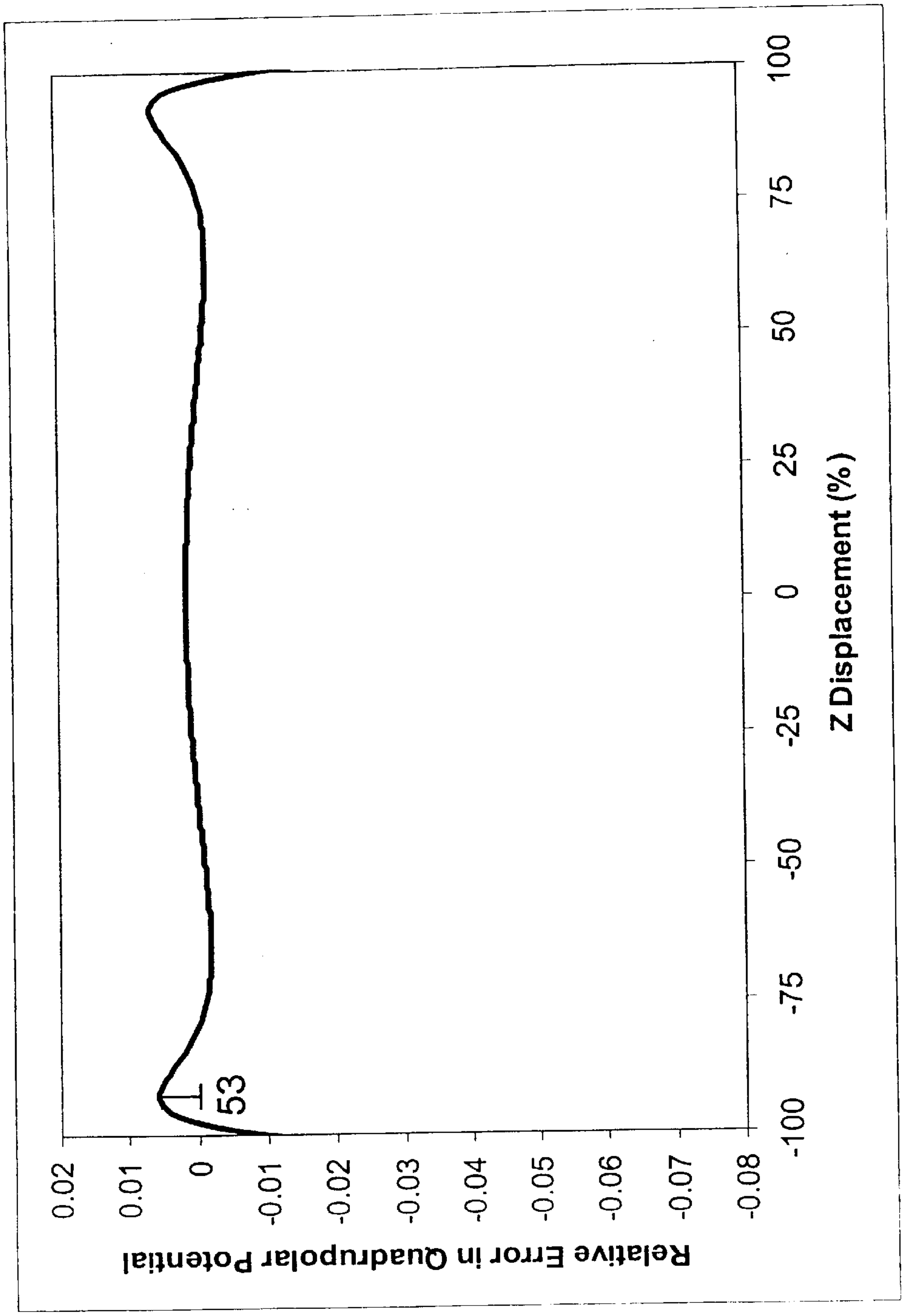
FIG. 5 is a graph of the error of the RF potential within a quadrupole ion trap, with the shim electrodes having an RF voltage applied thereto which is 9% of the amplitude, but 180 degrees out of phase with the RF potential applied to the ring electrode.

A computer simulation was carried out using SIMION-3D, Version 6.0 program and the errors of the electric potentials inside a quadrupole ion trap were plotted for three examples: 1) with apertured end cap electrodes only, 2) with apertured end plate electrodes with flush cylindrical shim electrodes, both maintained at the same RF voltage, and 3) with flush shim electrodes with, however, a voltage applied to the shim electrodes 180 degrees out of phase with the RF voltage applied to the ring electrode and having a magnitude less than that of the fundamental RF voltage. The electric potentials inside the ion trap, especially at the region of the holes in the end cap, are shown for a 0.060 in. hole in each end cap without a shim electrode and with a shim electrode having an internal diameter of 0.060 inches and an outer diameter of 0.080 inches placed in each 0.100 in. hole with one end flush with the surface of the end cap. A fundamental RF voltage of approximately 1,000 volts was applied. The shim voltage was between 50 and 100 volts. FIG. 3 shows substantial electric potential faults 51 near the end caps caused by the entrance and exit apertures, FIG. 4 shows little improvement of electric potential faults 52, but FIG. 5 shows a substantial improvement of electric potential faults 53. Thus, it is clearly apparent that the shim electrode with a proper voltage has a substantial effect on the configuration of the electric potentials within the ion trap volume 19.

Figure 6:
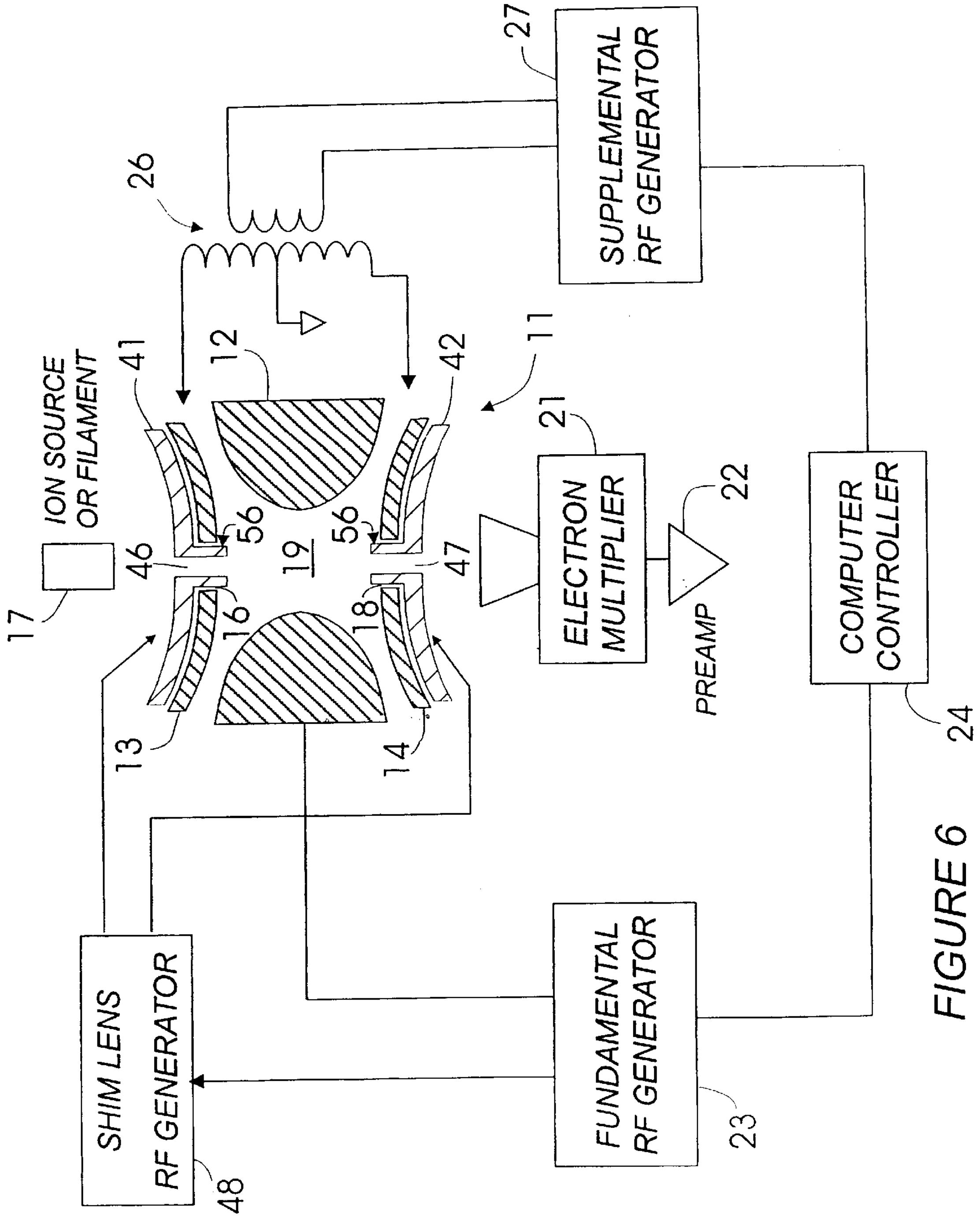
FIG. 6 shows a mass spectrometer with a trap in accordance with another embodiment of the invention.
Figure 7:
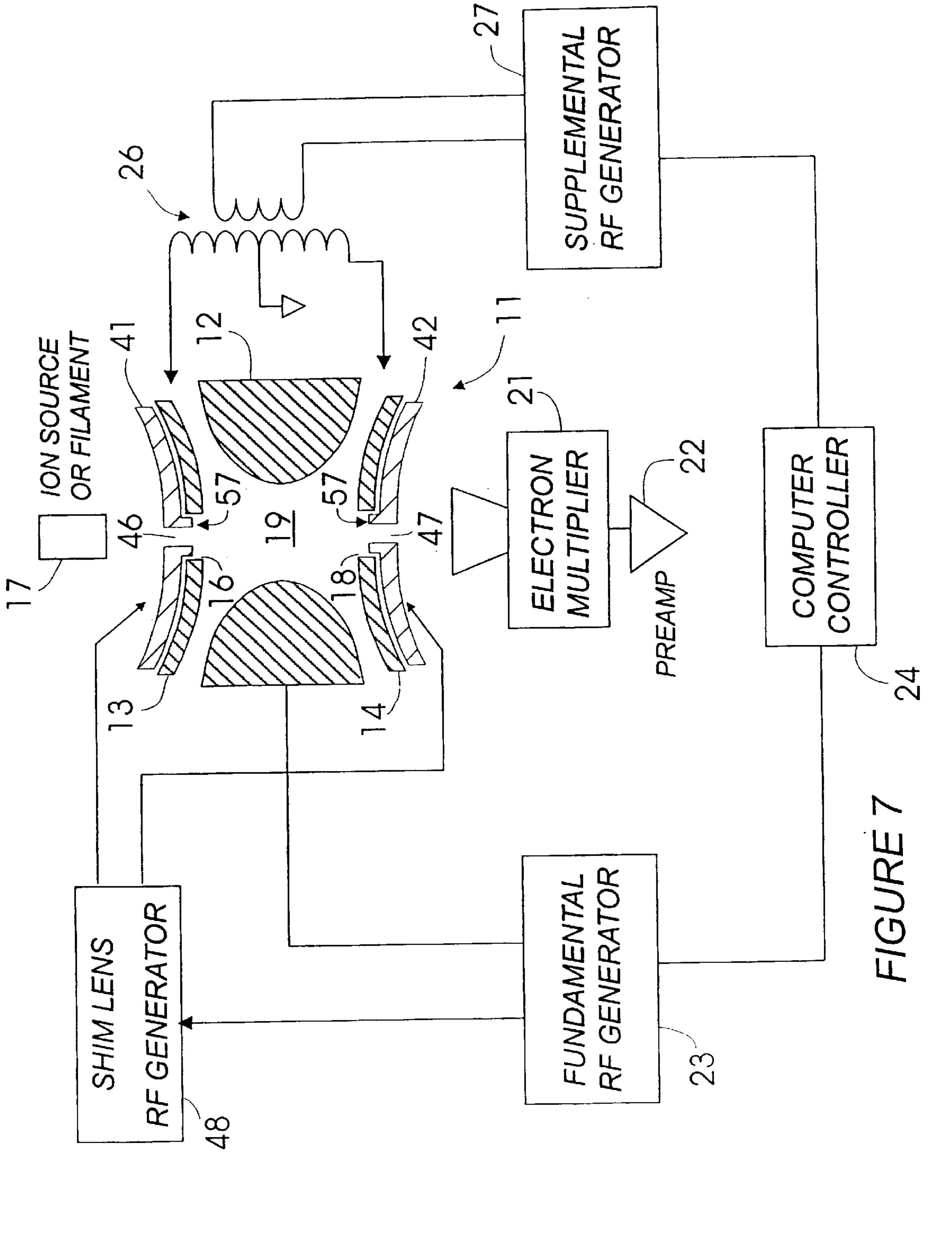
FIG. 7 shows an ion trap mass spectrometer in accordance with still another embodiment of the invention.

We have found that, in certain instances, greater improvement can be achieved by having the shim electrodes extend into the trapping volume beyond the surface of the end cap electrodes as shown at 56, FIG. 6. In other instances improvements have been found where the ends of the shim electrodes are indented into the end cap electrode hole as shown at 57, FIG. 7. Thus, the configuration of mechanical modifications with shim electrodes extended, flush or indented, and electrical modifications with a localized quadrupolar potential 180 degrees out of phase with that applied to the ring electrodes have provided substantial improvement of the electric potentials within the trap volume, particularly at the end cap apertures.

Figure 8:
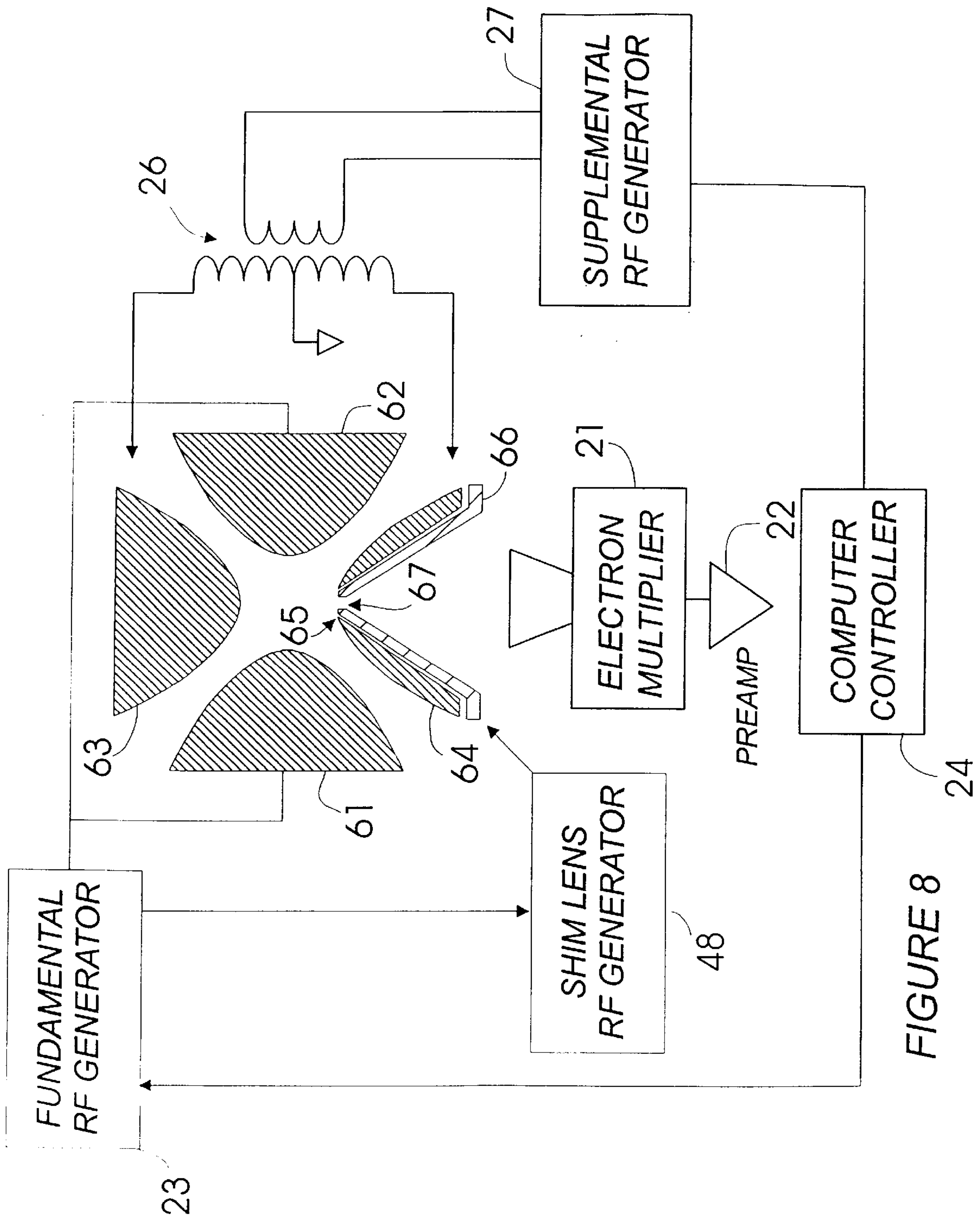
FIG. 8 schematically shows a linear ion trap mass spectrometer with improved ion trap electrodes.

Quadrupole ion traps of other configurations, as described in U.S. Pat. No. 5,420,425, are also susceptible to electric potential faults caused by apertures in the electrodes. One specific configuration, the linear quadrupole ion trap, is shown schematically in cross section in FIG. 8. In this specific configuration, the RF trapping voltage produced by RF generator 23 is applied to only two of the opposed electrodes 61 and 62. Electrodes 63 and 64 are connected to the secondary of transformer 26, which applies supplemental or excitation voltages. Electrode 64 includes an aperture 65 normally used for ejection of ions to detector 21. Electrode 64 is modified by providing a shim electrode 66 connected to the shim lens RF generator 48 to compensate for electric potential faults. The shim electrode includes aperture 67 for ion ejection. It is apparent from the teaching of U.S. Pat. No. 5,240,425 that the elongated electrodes may be curved.

One can also envision mass shifts which will be compound and shim voltage dependent. By sweeping the shim voltage magnitude while observing mass shifts, compound identity information may be obtained. Thus, it has been illustrated that with a proper combination of shim placement and applied voltage magnitude, mass shifts in compound studies can be reduced to essentially zero.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A quadrupole ion trap including:

a plurality of elongated electrodes defining a trapping volume, at least one of said electrodes including an aperture, and a shim electrode shaped to fit into and spaced from the walls of said aperture, said shim electrode having an aperture for the passage of ions ejected from said trap.

2. A quadrupole mass spectrometer comprising:

a plurality of spaced elongated electrodes defining a trapping volume, one of said electrodes including an aperture, a shim electrode shaped to fit into and spaced from the walls of the aperture, said shim electrode having an aperture for the passage of ions ejected from said trap, means for applying an RF trapping voltage to said electrodes, means for applying a supplemental RF voltage between the apertured electrode and an opposite electrode, and means for applying an RF shim voltage to said shim electrode.

3. A quadrupole mass spectrometer comprising:

a plurality of elongated spaced electrodes defining a trapping volume, an elongated aperture formed in one of said electrodes, a shim electrode having the same shape as the electrode aperture disposed in and spaced from the walls of the aperture, said shim electrode including an elongated aperture for the passage of ions ejected from said trapping volume, means for applying an RF trapping voltage to said electrodes, means for applying a supplemental RF voltage between the apertured electrode and an opposite electrode to excite and eject ions through said aperture, and means for applying an RF shim voltage to said shim electrode.

4. A mass spectrometer comprising:

a ring electrode, first and second end cap electrodes, said first and second end cap electrodes each including a central aperture, first and second shim electrodes having the same shape as the central apertures and located in and spaced from the walls of the aperture of the corresponding first and second end caps, said first shim electrode including a central aperture for introduction of sample ions into the trap or electrons for ionizing sample within the trap, and said second shim electrode including a central aperture for the passage of ions ejected from the ion trap, means for applying an RF trapping voltage to said electrodes, and means for applying an RF shim voltage to said first and second shims which is approximately 180° out of phase with the RF trapping voltage.

5. A quadrupole ion trap as in claim 4 in which the shim electrodes are cylindrical, with their end extending into the ion trap beyond the surface of the corresponding end cap electrode.

6. A quadrupole ion trap as in claim 4 in which the shim electrodes are cylindrical, with their ends flush with the surface of the corresponding end cap electrode.

7. A quadrupole ion trap as in claim 4 in which the shim electrodes are cylindrical, with their ends indented into the aperture of the corresponding end cap electrode.

8. A quadrupole ion trap as in claim 4 in which said shim electrodes are cylindrical.

9. A quadrupole ion trap mass spectrometer including a quadrupole ion trap comprising:

a ring electrode, first and second end cap electrodes, said first and second end cap electrodes each including a central aperture, first and second shim electrodes having the same shape as the central apertures and spaced from the walls of the aperture of the corresponding first and second end caps, said first shim electrode including a central aperture for introduction of sample ions into the trap or electrons for ionizing sample within the trap, and said second electrode including a central aperture for the passage of ions ejected from the ion trap, means for applying a fundamental RF voltage between the ring electrode and the end cap electrodes, means for applying a supplemental RF voltage between the end cap electrodes to excite ions in the trapping volume defined by the ring electrodes and end cap electrodes, and means for applying an RF shim voltage to said shim electrodes which is approximately 180° out of phase with the fundamental RF voltage.

10. A quadrupole mass spectrometer as in claim 9 in which the amplitude of the shim RF voltage is 10% or less of the fundamental RF voltage.

11. A quadrupole mass spectrometer as in claim 9 in which the amplitude of the shim RF voltage is 20% or less of the fundamental RF voltage.

12. A quadrupole mass spectrometer as in claim 9 including means for sweeping the shim voltage.

13. A quadrupole ion trap mass spectrometer including an ion trap comprising:

a ring electrode, first and second end cap electrodes, said first and second end cap electrodes each including a central aperture, first and second shim electrodes having the same shape as the central apertures and spaced from the walls of the aperture of the corresponding first and second end caps, said first shim electrode including a central aperture for introduction of sample ions into the trap or electrons for ionizing sample within the trap, and said second electrode including a central aperture for the passage of ions ejected from the ion trap, an RF generator for applying RF trapping voltages between the ring electrodes and the end cap electrodes, and a shim voltage RF generator for applying an RF voltage approximately 180 degrees out of phase with said RF trapping voltage to said shim electrodes.

14. A quadrupole ion trap mass spectrometer as in claim 13 including:

a supplemental RF generator for applying an excitation voltage across said end caps.

15. A quadrupole ion trap having spaced elongated electrodes, an aperture in at least one of said electrodes and a shim electrode disposed in and spaced from the walls of the aperture, said shim electrode including an aperture for ion ejection.

16. A quadrupole ion trap as in claim 15, where the shim electrode extends into the ion trap beyond the surface of the corresponding electrode.

17. A quadrupole ion trap as in claim 15, where the shim electrode is flush with the surface of the corresponding electrode.

18. A quadrupole ion trap as in claim 15, where the shim electrode is indented into the aperture of the corresponding electrode.

19. A linear quadrupole ion trap as in claim 15, including a means for applying a RF shim voltage to said shim electrode.

20. A quadrupole ion trap including a ring electrode and end cap electrodes defining a trapping volume, said end cap electrodes each including an aperture, means for applying an RF trapping voltage to said electrodes, a shim electrode for each of said apertures having the same shape as the electrode aperture and extending into and spaced from the wall of the aperture, and means for applying an RF shim voltage which is approximately 180° out of phase with the RF trapping voltage to said shim electrodes.

* * * * *